United States Patent [19]

Dunn et al.

[11] 4,372,232
[45] Feb. 8, 1983

[54] ELECTRONICALLY CONTROLLED SEWING MACHINE ARRANGED TO SEW THE MIRROR IMAGE OF A PATTERN IN THE FEEDING DIRECTION

[75] Inventors: William H. Dunn, Frankford Township, Sussex County; Leonard I. Horey, West Orange, both of N.J.

[73] Assignee: The Singer Company, Stamford, Conn.

[21] Appl. No.: 364,120

[22] Filed: Mar. 31, 1982

[51] Int. Cl.³ .............................................. D05B 3/02
[52] U.S. Cl. .............................................. 112/158 E
[58] Field of Search .......... 112/158 E, 121.11, 121.12, 112/158 B

[56] References Cited

U.S. PATENT DOCUMENTS 4,123,981 11/1978 Brown .............................. 112/158 E
4,237,803 12/1980 Nakanishi et al. ............... 112/158 E
4,341,170 7/1982 Beckerman et al. ............. 112/158 E Primary Examiner—Peter P. Nerbun
Attorney, Agent, or Firm—David L. Davis; Robert E. Smith; Edward L. Bell

[57] ABSTRACT

An electronically controlled sewing machine sews the mirror image of a pattern in the feeding direction by using for the first needle penetration the bight data of the first stitch of the pattern and feeds using the feed data of the last stitch of the pattern. Then the second needle penetration uses the bight data of the last stitch of the pattern, followed by feeding using the feed data of the next to last stitch of the pattern. This continues until the pattern is completed with the feed data of the first stitch.

3 Claims, 5 Drawing Figures

ELECTRONICALLY CONTROLLED SEWING MACHINE ARRANGED TO SEW THE MIRROR IMAGE OF A PATTERN IN THE FEEDING DIRECTION

DESCRIPTION

BACKGROUND OF THE INVENTION

This invention relates to sewing machines and, more particularly, to electronically controlled sewing machines.

Sewing machines employing sophisticated electronic technology for the storage and subsequent retrieval of stitch pattern information for a multiplicity of patterns have enjoyed great commercial success in recent years. One great advantage of the use of an electronically controlled sewing machine is in its simplicity of operation and control, as perceived by the user. With such a sewing machine, the user can select any one of a multiplicity of patterns by merely pushing a button. Additionally, with such a sewing machine, the user can alter the stitch pattern data that is stored in the sewing machine to control the size and/or shape of the selected pattern. For example, the user may vary the stitch length, vary the stitch width, sew a pattern having twice the length of the stored pattern, select a twin needle function for the sewing machine, etc. Additionally, it is known to provide the sewing machine with the capability of sewing the mirror image, in the direction of lateral needle jogging, of the selected pattern. This function may be accomplished by inverting the bight information with respect to the center needle position, as is well known in the art.

It would also be desirable to allow the user to sew the mirror image of a pattern in the feeding direction. Thus, for example, if a pattern of a train is provided in the sewing machine, with the train traveling along the direction of feed, by providing the "mirror feed" capability, the operator of the sewing machine could reverse the direction of travel of the train. In order to accomplish this, the stored stitch pattern data cannot be merely read in reverse. This is because, during the sewing operation, each stitch forming cycle consists of a needle penetration (bight) followed by cloth motion (feed). If the stitch pattern data were to be extracted from the memory in the reverse order of stitches and then stitches simply sewn with that order of data, the result would be an unrecognizable distortion of the pattern. Accordingly, it is an object of the present invention to provide a method and an arrangement operating in accordance therewith for sewing the mirror image of a stored pattern in the feeding direction.

SUMMARY OF THE INVENTION

The foregoing and additional objects are attained in accordance with the principles of this invention to sew a mirror image of a pattern in the feeding direction by using the following sequence. The first needle penetration uses the bight data of the first stitch of the pattern. Feeding is performed using the feed data of the last stitch of the pattern. Then the second needle penetration uses the bight data of the last stitch of the pattern, followed by feed using the feed data of the next to last stitch of the pattern. This continues until the pattern is completed with the feed data of the first stitch.

BRIEF DESCRIPTION OF THE DRAWINGS

The foregoing will be more readily apparent upon reading the following description in conjunction with the drawings wherein.

DETAILED DESCRIPTION

Figure 1:
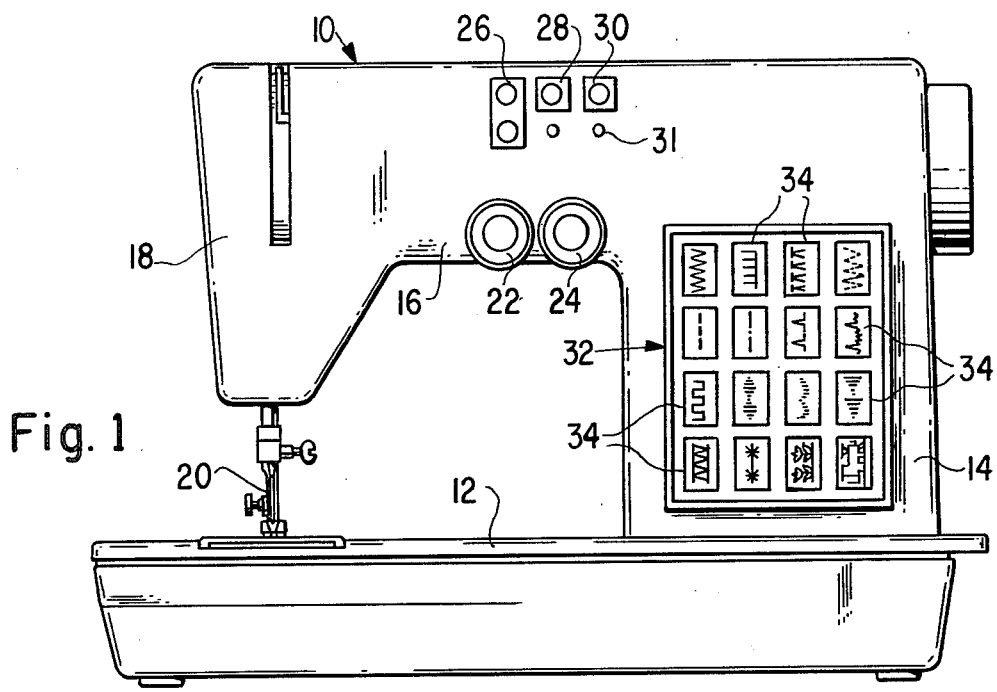
FIG. 1 is a front elevational view of an illustrative sewing machine in which this invention may be incorporated.

Referring now to the drawings, wherein like elements in different figures thereof have the same reference character applied thereto, FIG. 1 shows a sewing machine designated generally by the reference numeral 10. The sewing machine 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine, i.e., the positional coordinates of each stitch penetration may be influenced, for example, by data stored in a memory unit, as disclosed in U.S. Pat. No. 3,872,808, which is incorporated herein by reference. Briefly, the subject matter of the above-referenced patent includes means for controlling the lateral jogging of the needle 20 and/or direction and magnitude of feed motion of the work feed dog in response to electronic stitch pattern data extracted from a solid state read only memory carried in the sewing machine frame in timed relation with the operation of the sewing machine.

Operator controls for the sewing machine include a stitch length control 22 and a stitch width control 24 in the bracket arm 16. These controls 22 and 24 are effective to alter the operation of the needle jogging and work feeding actuators to motions different from that dictated by the stored data, as disclosed for example in U.S. Pat. No. 4,016,821. Additionally, there is further provided on the bracket arm 16 a single/double needle (twin needle) selection switch 26 and a mirror image selection switch 28 for sewing the mirror image of a selected pattern in the bight direction. In accordance with the principles of this invention, there is provided a mirror feed selection switch 30 which an operator may actuate to cause the sewing machine 10 to sew the mirror image of the selected pattern in the feeding direction as will be described in full detail hereinafter. Pattern selection is effected illustratively through an array 32 of pushbutton switches 34, each of which corresponds to a pattern of stitches, the information for forming which is stored within the static memory of the sewing machine 10. Illustratively, each of the pushbuttons 34 has on its face, where it is visible to an operator, a small schematic representation of the pattern as it would be sewn by the sewing machine upon actuation of that switch.

Figure 2:
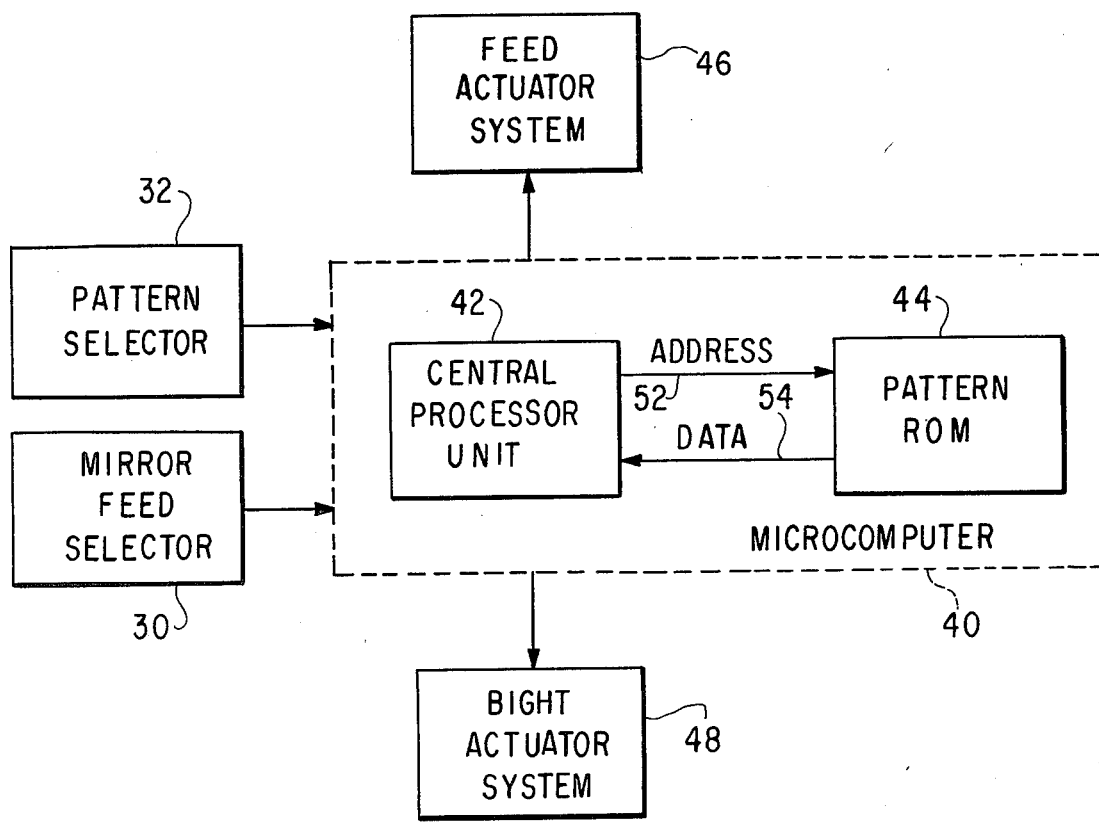
FIG. 2 illustrates a general block diagram of a microcomputer based control system for the sewing machine of FIG. 1.

FIG. 2 shows a general block diagram of a microcomputer based controller for the sewing machine shown in FIG. 1. As shown in FIG. 2, the microcomputer 40 receives input signals from the pattern selector 32 indicative of which pattern the sewing machine operator desires to be sewn. The microcomputer 40 includes an internal central processor unit (CPU) 42 and a pattern ROM 44. The CPU 42 obtains from the pattern ROM 44, in timed relation with the operation of the sewing machine 10, data for controlling the feed actuator system 46 and the bight actuator system 48. The feed actuator system 46 and the bight actuator system 48 are similar in construction and are adapted to convert a digital code word from the microcomputer 40 into a mechanical position which locates the sewing machine needle in a conventional stitch forming instrumentality and provides a specific work feed for each needle penetration. Illustratively, the microcomputer 40 may be a type R6500/1 microcomputer manufactured by Rockwell International Corporation. The central processor unit 42 provides addresses to the pattern ROM 44 over the leads 52 and receives in return eight bit bytes of data over the leads 54. All of the operator actuable switches are coupled to the microcomputer 40 through appropriate interface circuitry but for purposes of simplicity only the pattern selector 32 and the mirror feed selector 30 are shown in FIG. 2.

Figure 3:
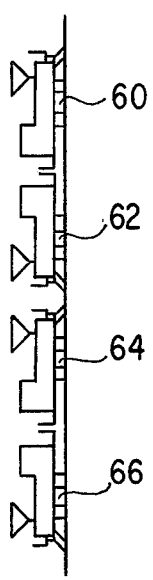
FIG. 3 illustrates pattern formation in accordance with the principles of this invention.

FIG. 3 shows an example of the sewing of a string of patterns wherein alternate patterns are sewn with the mirror feed function activated. The illustrative pattern is the train pattern. Thus, the first pattern sewn is the pattern 60 which is sewn in the normal manner. The second pattern sewn is the pattern 62 which is sewn with the mirror feed selector 30 actuated. The third pattern sewn is the pattern 64 which is sewn in the conventional manner. The fourth pattern sewn is the pattern 66 which is sewn with the mirror feed selector switch 30 actuated.

Figure 4A:
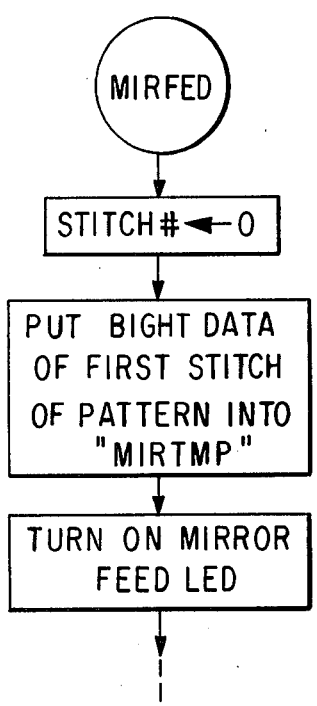
FIGS. 4A and 4B are flow charts of subroutines for operating the microcomputer of FIG. 2 in accordance with the principles of this invention.
Figure 4B:
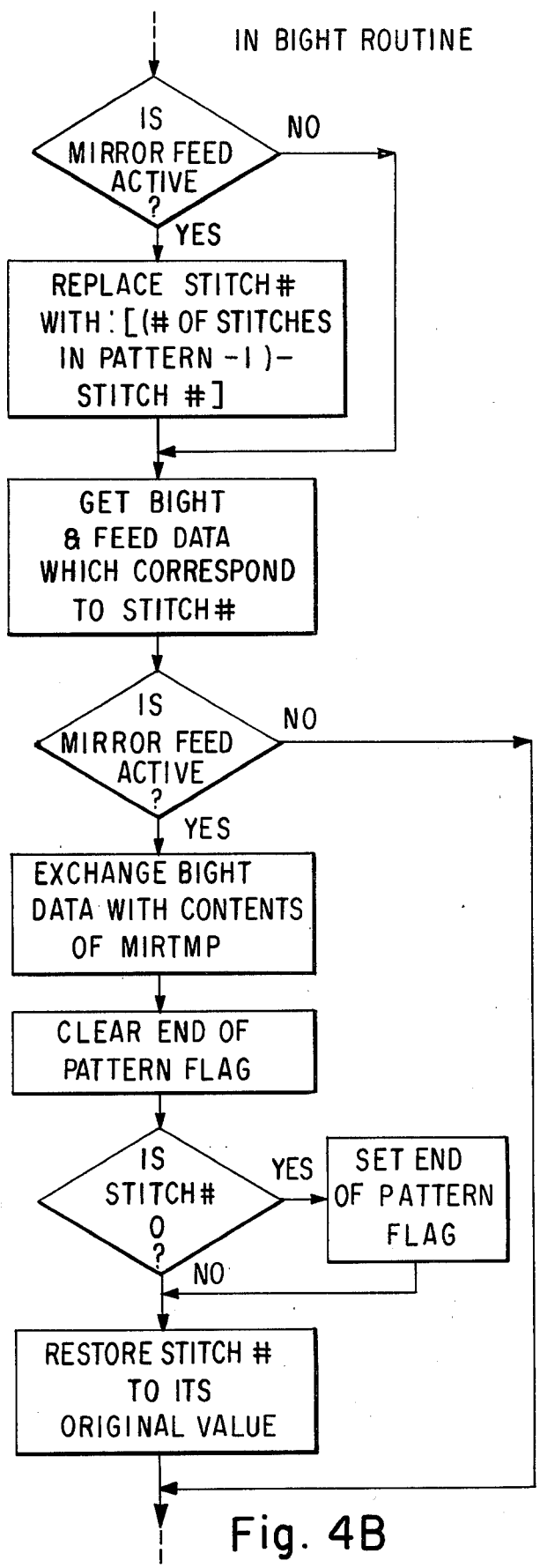

Appendix A and Appendix B to this specification illustrate subroutines for operating the microcomputer 40 to effect the mirror feed function and FIGS. 4A and 4B, respectively, are flowcharts for those subroutines. Before describing the subroutines, the manner of storing the stitch pattern information in the pattern ROM 44 will be briefly described. For each stitch, there are five bits of byte data, five bits of feed data and two control bits. Since the pattern ROM 44 is organized into eight bit bytes, three bytes of storage in the pattern ROM 44 are utilized for storing the information for two stitches. Thus, for each pair of stitches, the byte data, the control bits and one bit of the feed data for the first stitch are stored in a first byte of the memory; the remaining four bits of the feed data for the first stitch and four bits of the byte data for the second stitch are stored in a second byte of the memory; and the remaining bit of the byte data, the feed data, and the control bits for the second stitch are stored in the third byte of the memory. The pattern ROM 44 also contains a pattern address table (PATTAB) which stores the address of the byte for the first stitch in each pattern. The pattern ROM 44 also contains a pattern length table (PATLEN) which stores for each pattern a number equal to one less than the total number of stitches in that pattern. In this regard, it is to be noted that the counting of stitches within a pattern begins with the count of zero and goes up to one less than the total number of stitches in the pattern. Within the central processor unit 42 is a flag (MIRFED) which is non-zero if the mirror feed function is active. Also within the central processor unit 42 is a data holder (MIRTMP) which is used to hold data during mirror feeding.

When mirror feed is selected, by operator actuation of the mirror feed selector switch 30 (FIG. 1), the stitch count is set to zero, the mirror feed flag MIRFED is set, and the bight data for the first stitch of the selected pattern is saved in the temporary location MIRTMP, as shown in FIG. 4A and Appendix A. Additionally, the mirror feed light emitting diode (LED) 31 is lit. The microcomputer 40 then performs whatever functions it would normally perform until a bight synchronization pulse is received, in a manner well known in the art.

FIG. 4B and Appendix B illustrate the operation after a bight synchronization pulse is received. At each bight synchronization point, stitch data is obtained from the pattern ROM 44 and a check is made to see if the mirror feed flag MIRFED is set. If the flag is set, the stitch count is subtracted from the appropriate entry in the pattern length table PATLEN. The resulting number is used as the new stitch count number and is used to index into memory to retrieve the appropriate stitch data. The bight data which is obtained from the pattern ROM 44 is exchanged with the bight data which previously had been stored in the temporary location MIRTMP. In this manner, the bight data will always lag the feed data by one stitch, as is desired. Next, a check is made to see if the stitch count is zero. If the stitch count is zero, the end of pattern flag is set. Finally, the stitch count is again subtracted from the appropriate entry in the pattern length table PATLEN. This subtraction returns the stitch count number to its original value. Thus, the stitch count can be handled in the normal manner by the other program subroutines. Only the subroutine which obtains the stitch data from the pattern ROM 44 is required to know that the machine is in its mirror feed mode of operation.

Accordingly, there has been disclosed a method and an arrangement constructed in accordance therewith for sewing the mirror image of a pattern in the feeding direction. It is understood that the above-described embodiment is merely illustrative of the application of the principles of this invention. Numerous other embodiments may be devised by those skilled in the art without departing from the spirit and scope of this invention, as defined by the appended claims. For example, although a programmed microcomputer has been disclosed, this invention may also be practiced with a hard wired processor.

APPENDIX A

| LABEL | INSTR. | MODIFIER | COMMENTS |
|---|---|---|---|
| WHEN MIRROR FEED IS SELECTED: INITIALIZE PATTERN (SET STITCH NUMBER TO ZERO) THEN: ||||
| | LDA | PATNO | |
| | ASL | A | PATTERN #*2 |
| | TAX | | |
| | LDA | PATTAB,X | PATTERN ADDRESS TABLE |
| | STA | IABUF | |
| | INX | | |
| | LDA | PATTAB,X | |
| | STA | IABUT + 1 | INDIRECT ADDRESS BUFFER |
| | LDY | #$00 | |
| | LDA | (IABUF),Y | GET 1ST BIGHT |
| | AND | #$1F | MASK OFF ALL BUT BIGHT |
| | STA | MIRTMP | |

APPENDIX A-continued

| LABEL | INSTR. | MODIFIER | COMMENTS |
|---|---|---|---|
| . | | | |

APPENDIX B

| LABEL | INSTR. | MODIFIER | COMMENTS |
|---|---|---|---|
| IN BIGHT ROUTINE (AFTER LOADING INDIRECT ADDRESS BUFFER): | | | |
| . | | | |
| | LDA | MIRFED | IS MIRROR FEED ACTIVE? |
| | BEQ | SETST | |
| | LDX | PATNO | MIRROR FEED IS ACTIVE |
| | LDA | PATLEN,X | GET NUMBER OF STITCHES -1 IN PATTERN |
| | PHA | | SAVE NUMBER |
| | SEC | | |
| | SBC | STNO | |
| | STA | STNO | INVERT STITCH NUMBER |
| SETST | LDA | STNO | |
| | LSR | A | |
| | CLC | | |
| | ADC | STNO | A = INT (STNO*1.5) |
| . | | | |
| IN BIGHT ROUTINE (AFTER GETTING THE BIGHT AND FEED DATA): | | | |
| . | | | |
| BCTKCK | LDA | MIRFED | IS MIRROR FEED ACTIVE? |
| | BEQ | BCTKC2 | |
| | LDA | BREG1 | |
| | LDX | MIRTMP | PUT MIRTMP INTO BREG1 |
| | STX | BREG1 | |
| | STA | MIRTMP | SAVE DATA IN MIRTMP |
| | LDA | #0 | |
| | STA | EOP | MAKE SURE EOP = 0 UNLESS DONE |
| | LDA | STNO | |
| | BNE | FIXST | IF STNO ≠ 0, THEN NOT DONE |
| | INC | EOP | STNO = 0, SET EOP |
| FIXST | PLA | | GET (# STITCHES -1) IN PATTERN |
| | SEC | | |
| | SBC | STNO | |
| | STA | STNO | PUT STITCH NUMBER BACK TO CORRECT DIRECTION |
| BCTKC2 | . | | |

I claim:

1. In an electronically controlled sewing machine having stitch forming instrumentalities positionally controlled over a predetermined range between stitches to produce a pattern of feed and bight controlled stitches, means for storing pattern stitch information in an ordered sequence corresponding to the sequence of stitches within the pattern, means operating in timed relation with said sewing machine for extracting said pattern stitch information from said storing means, and actuating means responsive to said extracted pattern stitch information for influencing the feed and bight motions of said stitch forming instrumentalities to produce a pattern of stitches corresponding to said extracted pattern stitch information, a method for extracting said pattern stitch information so as to sew the mirror image of said pattern in the feeding direction, the method comprising the steps of:

(a) extracting the pattern stitch information for the first stitch of said pattern;

(b) saving the extracted bight information in a temporary storage location;

(c) extracting the pattern stitch information for the (T−N)th stitch of said pattern, where T is the total number of stitches in said pattern and N=0;

(d) exchanging the extracted bight information of step (c) with the bight information in the temporary storage location;

(e) forming a stitch with the exchanged bight information from step (d) and the extracted feed information from step (c);

(f) incrementing N by one; and (g) repeating steps (c) through (f) with the incremented value of N until T−N=0.

2. An electronically controlled sewing machine having stitch forming instrumentalities positionally controlled over a predetermined range between stitches to produce a pattern of feed and bight controlled stitches, means for storing pattern stitch information in an ordered sequence corresponding to the sequence of stitches within the pattern, the pattern stitch information for each stitch including separately identifiable bight and feed information, switch means actuatable by an operator to effect the sewing of the mirror image of the pattern in the feeding direction, and means responsive to actuation of said switch means for sequencing through said pattern stitch information in the reverse order and wherein for each stitch in the mirror image there is used the feed information for that stitch and the bight information for the succeeding stitch according to the original ordered sequence.

3. The sewing machine according to claim 2 wherein said sequencing means utilizes the bight information for the first stitch and the feed information for the last stitch when forming the mirror image first stitch.

* * * * *